(No Model.)

A. WICKEY.
DRAFT EQUALIZER.

No. 273,210. Patented Feb. 27, 1883.

WITNESSES:
W. W. Hollingsworth
John C. Kernon

INVENTOR:
Andrew Wickey
BY Munn & Co
ATTORNEYS.

UNITED STATES PATENT OFFICE.

ANDREW WICKEY, OF QUINCY, ILLINOIS.

DRAFT-EQUALIZER.

SPECIFICATION forming part of Letters Patent No. 273,210, dated February 27, 1883.

Application filed December 12, 1882. (No model.)

*To all whom it may concern:*

Be it known that I, ANDREW WICKEY, of Quincy, in the county of Adams and State of Illinois, have invented a new and useful Improvement in Draft-Equalizers; and I do hereby declare that the following is a full, clear, and exact description of the same, reference being had to the accompanying drawings, forming part of this specification, in which—

Figure 1:
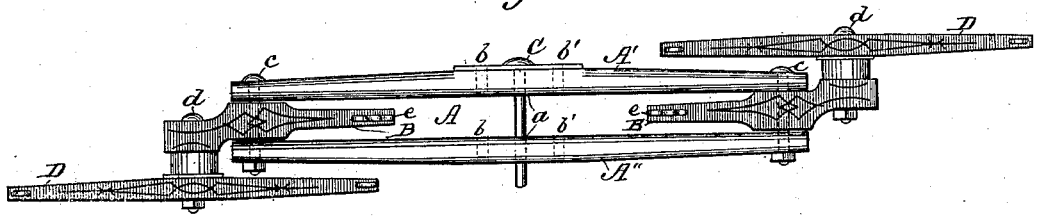
Figure 2:
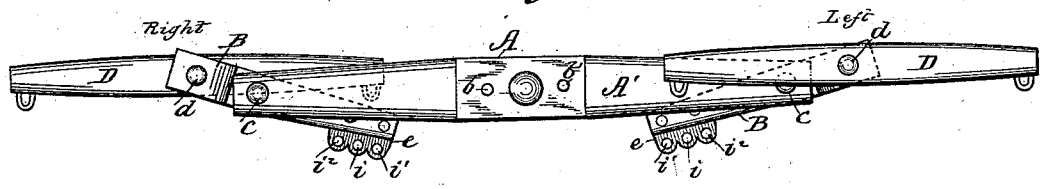
Figure 3:
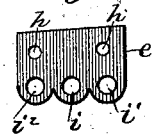

Figure 1 is a front elevation. Fig. 2 is a plan view, and Fig. 3 a detail view.

My invention relates to improvements in the draft-equalizer of Presson W. Thompson, for which Letters Patent were granted him October 24, 1876, and numbered 183,726, in which Letters Patent levers having draft-hooks on their free ends and pivoted to the single-trees at their inner ends and between the two parts or bars of the double-tree are employed, the construction being arranged for operation as a two or three horse equalizer. In the construction of Thompson referred to there are no means provided for giving a weak horse any advantage over strong horses hitched to his equalizer, and all the horses attached to the equalizer must pull alike or equal.

The object of my invention is to remedy this defect, and provide means whereby a stronger horse is made to pull more than a weaker one, and to this end my invention consists in providing the upper and lower bars of the double-tree with poles arranged on opposite sides and at equal distances from the swivel or fulcrum pin of the double-tree, by means of which the double-tree is pivoted, whereby the swivel-pin of the double-tree may be shifted to favor a weak horse, and in securing to the free ends of the levers pivoted to the single-trees and between the bars of the double-trees metallic plates provided with three holes near their outer edges for the insertion of the hooks of the tug-straps or traces of the middle horse, to vary the leverage, as hereinafter more fully set forth.

In the accompanying drawings, A represents the double-tree of my improved draft-equalizer, consisting of an upper bar, A', and a lower parallel bar, A'', connected together at the middle of each by the swivel or fulcrum pin C, passing through the opposite holes $a$ in the middle of the upper and lower bars, A' A'', composing the double-tree.]

$b$ $b'$ represent opposite holes formed in the bars A' A'' of the double-tree A, on each side of the central hole, $a$, into which the swivel-pin C may be shifted, as desired, to change the leverage of the double-tree.

B B represent levers pivoted between the bars A' A'' of the double-tree A by bolts $c$ $c$.

D D represent the single-trees, pivoted to the shorter ends of the levers B by bolts $d$, and provided with the ordinary tug or trace hooks at their ends.

To the free ends of the levers B are secured the metallic plates $e$, provided with holes $h$ $h$, for the passage of bolts passing through the holes $h$ and through corresponding holes near the outer end of the levers B. Each plate $e$ is provided near its outer edge with a central draft-hole, $i$, for the insertion of the tug or trace hooks of the middle horse, and also with the draft-holes $i'$ $i^2$, lying on opposite sides of the central hole, whereby, by changing the tug-hooks into the different holes, the leverage may be varied as desired. Preferably the plates $e$ are secured to the free ends of the levers B by forming slots in the outer ends of the latter, which receive the inner ends of the plates $e$, and passing bolts through the free ends of the levers B and through the holes $h$ $h$ near the inner edges of the plates $e$.

In lieu of employing the plates $e$, provided with the draft-holes $i$ $i'$ $i^2$ for the tug-hooks, a single draft-hole may be employed in each plate $e$ and the same result attained as when the plates $e$ are used by forming three holes in the lever B for the passage of the bolts $c$ and adjusting the levers B in the bar A, instead of adjusting the tug-hooks in the holes $i$ $i'$ $i^2$ of the plates $e$.

In practice, suppose it is desired to make the stronger horse on the left, as marked "Left" in Fig. 2 of the drawings, pull more, the swivel-pin C is withdrawn from the central holes $a$ and is inserted in the holes $b'$ $b'$ of the double-tree, and the left tug-hook of the middle horse is inserted in the hook-hole $i'$ of the plate $e$ and the other tug-hook of the middle horse into hook-hole $i'$ on the opposite or right side of the middle horse—that is, on the side of the horse to be favored—or else the middle horse would still pull hardest on the shoulder next to horse that pulls hardest; or, in other words, the middle horse would be also favored on the shoulder next the favored horse, for did the tug-hook remain in the central hole $i$ of the plate $e$ it will be seen that by moving the swivel-pin C to the left of the center the middle horse would have to pull harder on one shoulder than the other, and that by changing the tug-hook of the middle horse from the central hole in the left plate $e$ toward the center of the draft-equalizer there is no change in the draft of the middle horse, and that the right-hand or weaker horse is favored. If in turn it is desired to make the middle horse pull most, his tug-hooks are inserted in the outer holes, $i^2$, of the plates $e$. If, on the other hand, it is desired to favor the middle horse, his tug-hooks are inserted in the inner holes, $i'$ $i'$, of the plates $e$. If the swivel-pin passes through the central hole in the double-tree and the tug-hooks of the middle horse are inserted in the central holes of the plates $e$, all the horses pull equally, or alike. Instead of moving the swivel-pin C to either of the holes $b$ or $b'$ and allowing it to pass through the central holes $a$ $a$, the tug-hooks of the middle horse may be moved toward the center of the double-tree to favor him, or to the outer holes to favor the two outer horses.

Having thus fully described my invention, what I claim as new, and desire to secure by Letters Patent, is—

1. The combination, with the levers B, pivoted to the single-trees D and to a double-tree, of the plates $e$, secured to the free ends of the levers B, and each provided with the three holes $i$ $i'$ $i^2$, substantially as described, and for the purpose set forth.

2. The combination, with the double-tree A, composed of the two parallel bars A′ A″, each provided with opposite holes $a$ $b$ $b'$ for the passage of the swivel-pin C, and levers B, pivoted to the single-tree D and between the parallel bars A′ A″ of the double-tree A, of the plates $e$, secured to the free ends of the levers B, and each provided with the three holes $i$ $i'$ $i^2$, substantially as described, and for the purpose set forth.

ANDREW WICKEY.

Witnesses:
GEORGE W. FOGG,
JAMES F. CARROTT.